(12) United States Patent
Okano et al.

(10) Patent No.: US 6,641,717 B2
(45) Date of Patent: Nov. 4, 2003

(54) WATER PURIFIER

(75) Inventors: Masaaki Okano, Nagoya (JP); Atsushi Hatakeyama, Tokyo (JP); Kunio Kido, Tokyo (JP); Yoshiyuki Matsuoka, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/821,800

(22) Filed: Mar. 30, 2001

(65) Prior Publication Data

US 2003/0062300 A1 Apr. 3, 2003

(30) Foreign Application Priority Data

Mar. 30, 2000 (JP) ........................................ 2000-095914

(51) Int. Cl.[7] .............................. B01D 35/04; G01F 1/06
(52) U.S. Cl. ........................... 210/87; 210/93; 210/449; 73/861.88; 116/274; 116/291
(58) Field of Search ............................... 210/85, 87, 93, 210/449, 282; 222/26, 28, 29, 32, 189.06–189.11; 116/273, 274, 291, 292; 73/861.88

(56) References Cited

U.S. PATENT DOCUMENTS

| 4,873,282 A | * | 10/1989 | Yui et al. |
| 5,705,067 A | * | 1/1998 | Sumi et al. |
| 5,873,995 A | * | 2/1999 | Huang et al. |
| 5,997,734 A | * | 12/1999 | Koski et al. |

FOREIGN PATENT DOCUMENTS

| JP | 61114130 A | 5/1986 |
| JP | 61-155091 | 9/1986 |
| JP | 2-1295 | 1/1990 |
| JP | 3-26390 | 3/1991 |
| JP | 5-7867 | 1/1993 |
| JP | 05138159 A | 6/1993 |
| JP | 05185070 A | 7/1993 |
| JP | 8-285642 | 11/1996 |
| JP | 8-318113 | 12/1996 |
| JP | 9-229731 | 9/1997 |

OTHER PUBLICATIONS

Patent Abstracts of Japan, "Water Purifying Device", Tomotaka et al., Publ. No. 05007867 A; Publ. Date: Jan. 19, 1993.
Patent Abstracts of Japan, "Flow Meter", K. Nobuyuki, Pub. No. 08285642 A; Publ. Date: Nov. 1, 1996.
Patent Abstracts of Japan, "Flow Rate Checker and Water Purification Device", Yosuke et al., Pub. No. 09229731 A, Publ. Date: Sep. 5, 1997.
Patent Abstracts of Japan, "Filter Cartridge of Water Purifier", O. Kenichi, Publ. No. 08318113 A, Publ. Date: Dec. 3, 1996.

* cited by examiner

*Primary Examiner*—Joseph Drodge
*Assistant Examiner*—Terry K. Cecil
(74) *Attorney, Agent, or Firm*—Fitch, Even, Tabin & Flannery

(57) ABSTRACT

A water purifier 40 includes a flow meter 42 for measuring the cumulative flow of water through a water purification cartridge 6. The flow meter has an indicator portion 44 that rotates in response to increasing cumulative flow and a graduated portion 46 rotating about the same axis as that of the indicator portion. The graduated portion includes an insertion groove 29 for manually rotating the graduated portion in order to reset the flow meter. Because the flow meter has few part, the body of the water purifier can be made compact and its cost reduced.

11 Claims, 8 Drawing Sheets

WATER PURIFIER

BACKGROUND OF THE INVENTION

1. Field of the Invention

The present invention relates to a water purifier to filter and purify tap water, and especially relates to a water purifier for use in a typical home.

The present application is based on Japanese Patent Application No. 2000-95914, the contents of which are incorporated by reference.

2. Description of Related Art

Water purifiers to purify tap water have been used, because of contamination of water resources and demands for obtaining water with a pleasant taste. Water purifiers which have the functions of removing chlorine odor, mold odors and trihalomethanes from tap water by using an absorbent such as activated carbon, and of removing bacteria or impurities by using porous hollow fiber membranes are known.

As one type of water purifier 10, a water purifier mounted a faucet directly as shown in FIG. 11 is on the market and is used in general households. In this water purifier 10, the main housing 1 is attached to the faucet 2 with the adapter 3 and the fixed ring 4. By operating the switching lever 5, it is possible to switch between tap water and purified water by the switching mechanism built into the main housing 1. Water purification cartridge 17 is mounted on the main housing 1, and a flow meter 20 is also provided. In this water purifier 10, when the switching lever 5 is set to the purified water position and tap water flows from the faucet 2, it is led to the water purification cartridge 17 by the switching mechanism. And after passing through the filtering medium and being purified, it passes through the water flow meter 20 and flows out downwards from the purified water outlet 9.

The main housing 1 is provided with a gear reduction type flow meter 20 which measures the integrated outflow of purified water as means of knowing the replacement life of the water purification cartridge 17. Thus, there is a mechanism for periodically replacing the water purification cartridge 17 according to the display of the flow meter 20. As the display, the indicator portion 21 gradually appears downwards as the outflow increases and it is possible to recognize the outflow in combination with it and the graduations and letters of the graduated portion 22.

Further, a flow meter is disclosed in Japanese Unexamined Patent Application, First Publication No. Hei 8-285642, and Japanese Unexamined Patent Application, First Publication No. Hei 8-318113 discloses a filter cartridge for a water purifier which uses this flow meter. In this flow meter, an index Indicator portion) provided on the final gear rotates with an increase of flow, and the graduations (graduated portion) indicate the amount of rotation, so that the amount of flow can be recognized. Because this constitution makes use of planetary gears having the same center axle, it can be relatively compact and inexpensive.

[1](i) Incidentally, for a water purifier to replace water purification cartridges, even if a flow meter is provided, if the flow meter cannot be reset (returned it to its original setting) when the water purification cartridge is replaced, it is difficult to know when to replace the new purification cartridge practically.

However, in the flow meter disclosed in the above-indicated Japanese Unexamined Patent Application, First Publication No. Hei 8-285642 and Japanese Unexamined Patent Application, First Publication No. Hei 8-318113, there is no provision of a mechanism which makes it possible to reset (return to the original setting) the indicator portion for the graduated portion. As a result, to recognize the amount of movement of the indicator portion, it is necessary to remember or record the original position of the indicator portion, when the water purification cartridge is started to use, and to ascertain the position of the end point for that original position, so the way of use is very troublesome and inconvenient. This problem is especially notable in homes where the water purification cartridge is frequently replaced.

The water purifier shown in the above-indicated FIG. 11 is provided with a mechanism that automatically resets the indicator portion 21 for the fixed graduated portion 22 by using the fit with the external shape of the water purification cartridge 17 when the water purification cartridge 17 is mounted on the main housing 1 at the time of replacing the water purification cartridge 17.

However, the mechanism to perform the automatic resetting is complex, and it is combined and built into the interior of the flow meter 20. Therefore, the size of the main housing 1 is increased to the volume of the mechanism, and which is not preferable, especially such a water purifier mounted a faucet directly which is required to be compact. Further, since this increases the amount of material and the number of parts, the assembly cost also increases, which leads to an increase of the product cost.

(ii) Further, in the water purifier 10 shown in FIG. 11 and Japanese Unexamined Patent Application, First Publication No. Hei 8-285642, it is inconvenient to clean. Because the graduated portion 22 cannot be detached from the flow meter 20 and even if the front or rear of the graduated portion 22 becomes contaminated with bacteria or mold, it cannot be soaked with detergent and washed or its rear portion cannot be scrubbed. And further, if it becomes heavily soiled, it cannot be replaced, even if it is desired to do so.

(iii) Furthermore, the water purifiers provided with the flow meters disclosed in Japanese Unexamined Patent Application, First Publication No. Hei 8-285642 and Japanese Unexamined Patent Application, First Publication No. Hei 8-318113, and the water purifier 10 shown in FIG. 11 can serve as a guides for the replacement time only for a predetermined type of purification cartridge, but if a water purification cartridge with a different lifetime is mounted on the water purifier, it is not possible to know the replacement time for it. As a result, the users cannot use a water purification cartridge with a longer lifetime against their will On the other hand, the makers must produce other water purifier products, which is illogical.

[2](iv) Furthermore, in the water purifier of Japanese Unexamined Patent Application, First Publication No. Hei 8-318113, because the flow meter is built into the water purification cartridge, the cost of the flow meter is added to the cost of the water purification cartridge, which increases the product cost of the water purification cartridge. In this case, the frequency of replacing the water purification cartridge is high, so the users must bear a considerable economic burden, which is not preferable from the economical point of view.

Further, because the flow meter like the water purification cartridge becomes disposable, it is also discarded as waste whenever the water purification cartridge is replaced. Particularly in the water purifier mounted to a faucet directly which have a short lifetime of water purification cartridge, because the frequency of replacement is high and the amount of flow meters discarded as waste will be large, which was a problem since it is environmentally unfavorable.

(v) Further, in the water purifier 10 of the prior art or the water purifier provided with a flow meter disclosed in Japanese Unexamined Patent Application, First Publication No. Hei 8-318113, when the flow meter itself becomes dirty, the flow meter cannot be detached and soaked with detergent and washed, and cannot be scrubbed, so it is inconvenient to clean it. And when it becomes very dirty, it cannot be replaced even if it is desired to do so. What is more, in case the flow meter breaks down, it cannot be detached and repaired, and so it cannot be replaced, which is the problem that maintenance is inconvenient in that point.

(vi) In the material of the rotating members used as components of the flow meter, polyacetal resin is generally favored, because of its excellent abrasion resistance and the like. However, in recent years the flow meter is especially requested to be more compact and improve durability, and the abrasion resistance and strength of polyacetal resin are insufficient.

(vii) Further, if the rotating members of the flow meter become abraded or rupture due to an increase of water flow over a long time, or if foreign matter flows into the flow meter at the time of replacing the water purification cartridge, and becomes temporarily stuck, even though the water flow increases, the rotating portion will not move, and there is a fear that the indicator portion 21 will break down and stop. Although the speed of the indicator portion 21 after the final speed reduction is generally very slow, and the only way to ascertain whether it has malfunctioned and stopped is to observe the indicator portion 21, which is visible, over a long time, and it should cost a lot of work and time to do that. If users should neglected the observation, they would continue to use the water purifier without noticing that it has broken, and they would be liable to continue to use the water purification cartridge whose lifetime has expired.

(viii) Further, in the water purifier 10 of prior art and the water purifier provided with the flow meter of Japanese Unexamined Patent Application, First Publication No. Hei 8-318113, if they are used over a long time, the instantaneous flow of purified water decrease due to clogging to the filtration material in the water purification cartridge, and so the time required to draw water becomes longer, which loses the convenience of use. To solve that problem, it is desired to provide an indicator which has functions of showing the state of the instantaneous flow and of promoting replacement of the new water purification cartridge. For example, Japanese Unexamined Patent Application, First Publication No. Hei 5-7867 and Japanese Unexamined Patent Application, First Publication No. Hei 9-229731 disclose such indicators.

However, in these indicators of prior art, it is basically necessary for them to be provided with a spring and a resistive body on the water flow passage of the inside the water purifier and a transparent housing to build into them and a window and graduations on the main housing of the water purifier. So the size and cost of the water purifier will inevitably increase. But the water purifier mounted a faucet directly is especially requested to be compact and cheep, so it is practically difficult to build them in combination with a flow meter.

BRIEF SUMMARY OF THE INVENTION

The present invention was made in order to solve the above problems, and therefore aims to provide an excellent water purifier which is compact and low cost constitution and has the flow meter which can be easily and accurately be reset and be easily kept clean and work for several types of water purification cartridges.

Further, another goal is to provide an excellent water purifier, which is compact and low cost, with a built-in flow meter of excellent durability and compact size, which can further be to used efficiently from the environmental and economical points of view, which makes allowance easily and accurately to notice of malfunctions of the flow meter, and which is also provided with an indicator function which can recognize the time to replace the water purification cartridge, when the instantaneous flow of purified water decreases.

The water purifier according to a first embodiment of the invention is provided with a flow meter which measures the integrated flow of purified water which has passed through the water purification cartridge, wherein the flow display of the said flow meter is characterized by comprising an indicator portion which rotates with an increase of the flow, and a graduated portion which can rotate around an axis which is the same as that of said indicator portion.

In this water purifier, to reset of the flow meter can be carried out accurately and easily without building into the main body an internal flow meter with a complex mechanism for resetting the flow meter display automatically. Consequently it is possible that the main body becomes small, the amount of material and the number of parts decrease, and the cost is reduced. And a compact and low cost product can be achieved.

It is desirable to form an insertion groove at said graduated portion so that the rotation operation of the graduated portion can be carried out by a coin or the like.

In this way, the resetting operation can simply and easily be carried out by ordinary demanders.

Further, it is desirable that the graduated portion have a curvature so that it can project outwards, with an insertion slot formed near the center thereof since this formation makes the graduated portion possible to increase the strength.

Further, it is preferable that the graduated portion can be detachable from the flow meter.

In this way, the graduated portion can be easily cleaned or replaced, so it keeps clean.

Further, it is desirable to provide markings on the graduated portion which serve as guides for the replacement time for several types of water purification cartridge having different lifetimes As a result, it is possible to use several types of water purification cartridges, which can provide a great deal of convenience and economy for the users.

The water purifier according to claim 6 is characterized by being provided with a main housing and a water purification cartridge mounted on the main housing, the flow meter which measures the integrated flow of purified water passing through the water purification cartridge is detachably built into the main housing.

In this way, the flow meter of excellent durability and compact size is built to being used efficiently from economical and environmental points of view. Moreover, it is possible to clean or replace the flow meter.

It is desirable for the flow meter to comprise an impeller which is rotated by the water flow, a plurality of planetary gears which sequentially transmit the rotation by planetary motion and reduce the speed of rotation, and an indicator portion which interlocks the final rotating gear, and a housing which contains these members.

This is why the water purifier may be small and low cost.

The water purifier according to claim 8 is characterized by being provided with a flow meter which measures the integrated flow of purified water based on the rotation of an impeller which rotates with the flow of purified water through the water purification cartridge, wherein the impeller of the flow meter is visible from the outside.

As a result, malfunctions of the flow meter can be easily and accurately ascertained.

It is desirable for the impeller to be set to start rotating at or above a prescribed value of the water flow.

As a result, an indicator function is provided which recognizes the time to replace the water purification cartridge, when the instantaneous flow of purified water is reduced. Furthermore, the water purifier can be constituted in a compact manner and at low cost, so it provides a great deal of convenience and economy for the users.

Further, it is desirable for the rotating members used in the flow meter to be made of a polyacetal resin which contains carbon.

It is possible for the flow meter to be more compact and to have a longer lifetime, because the rotating members have extremely high abrasion resistance and durability.

It is desirable to use a porous hollow fiber membrane as the filtration material of the water purification cartridge.

This is because it has such an excellent filtration performance as to remove bacteria, and it has excellent performance in removing impurities.

It is desirable to provide the flow meter after the final stage of the water purification cartridge.

As a result, since impurities have been removed by porous hollow fiber membrane in the water purification cartridge and the flow meter measures the flow of purified water, so that breaking down of the flow meter can be prevented due to clogging to the rotating members by impurities and the like The present invention takes the above notable effects, especially on water purifier mounted a faucet directly, that is, on water purifier where frequency of replacing the water purification cartridge is expected to be high comparatively.

DETAILED DESCRIPTION OF THE INVENTION

First Embodiment

Figure 1:
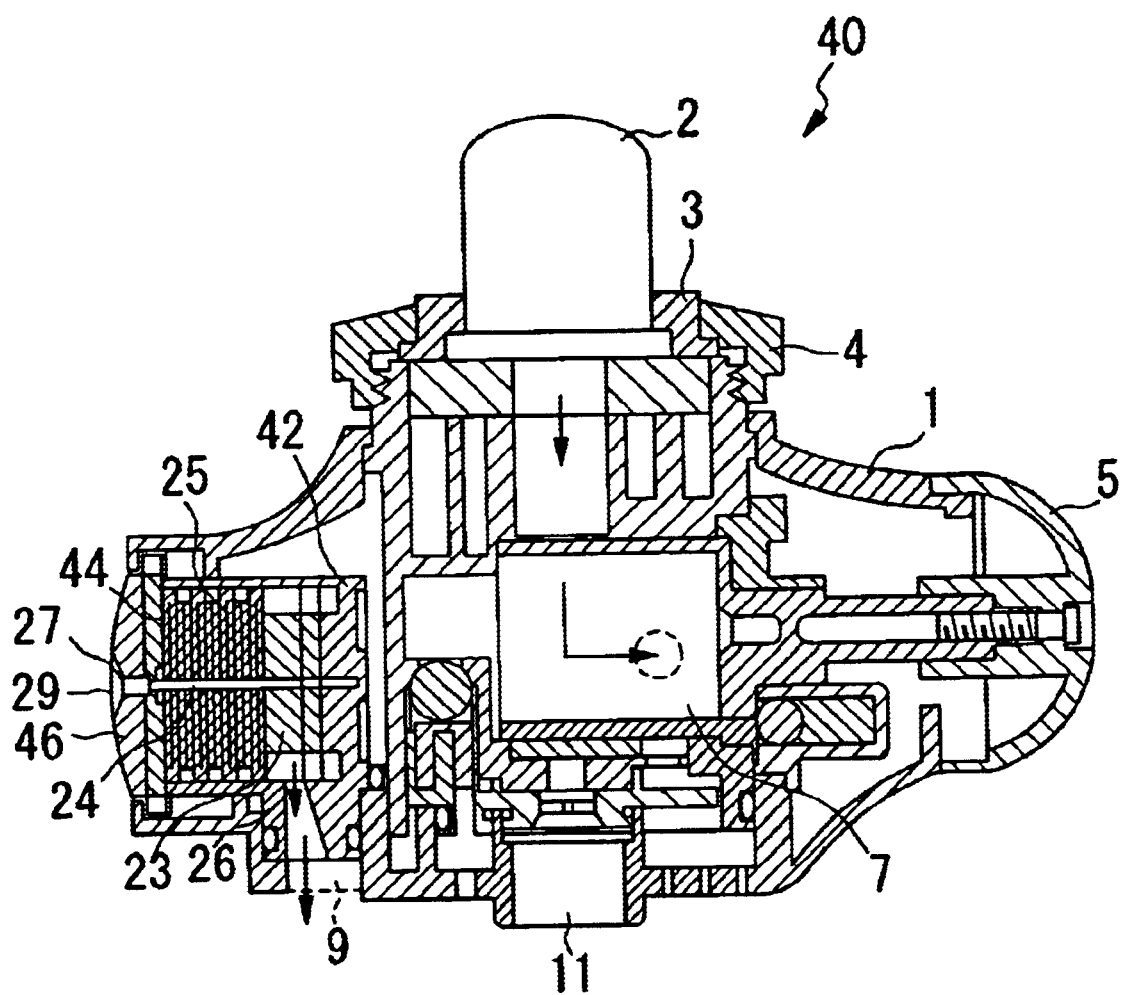
FIG. 1 is a longitudinal sectional view of the water purifier according to the first embodiment.
Figure 2:
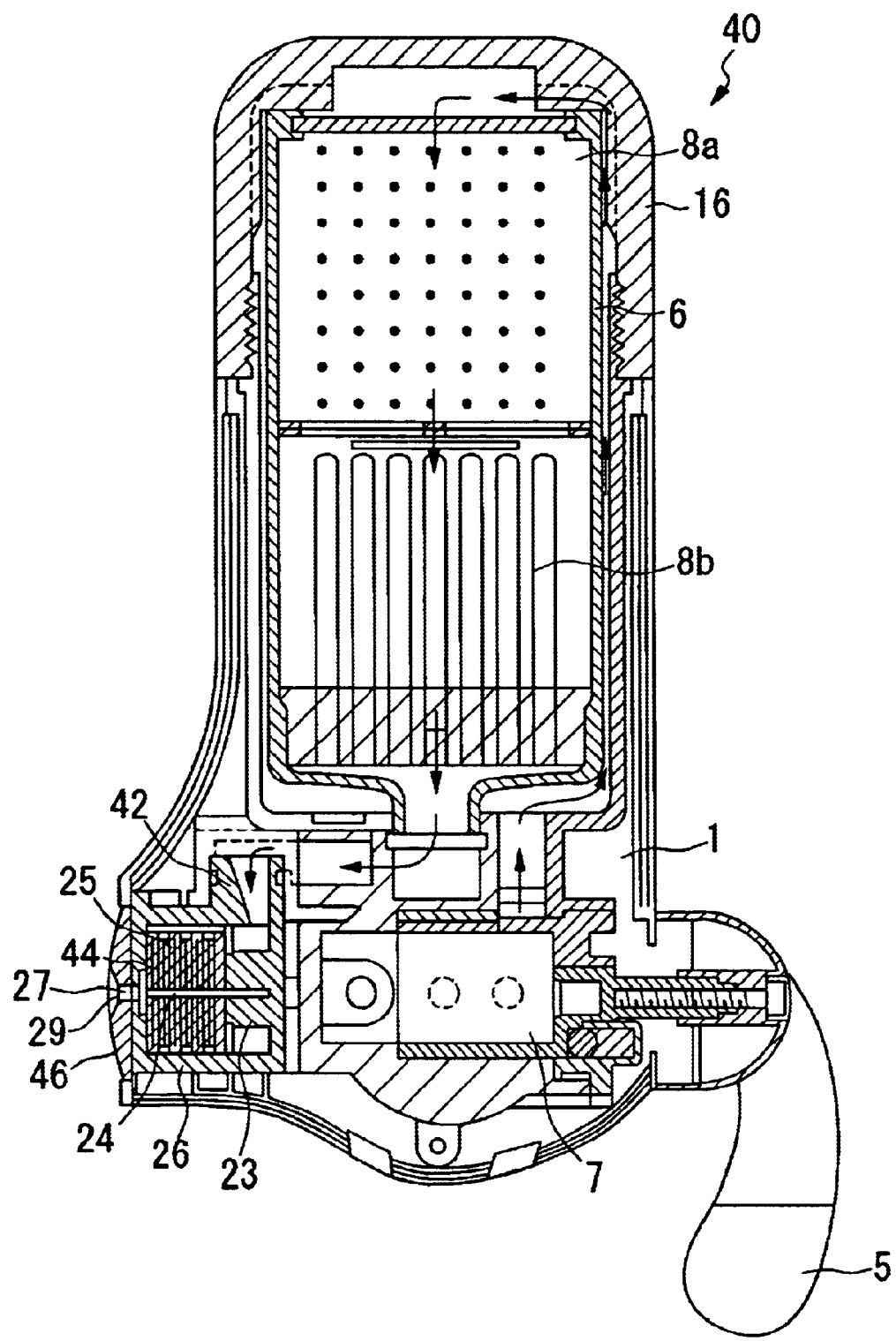
FIG. 2 is a cross sectional view of the water purifier according to the first embodiment.

The first embodiment will be explained with reference to FIGS. 1 and 2.

The example of the water purifier 40 shown in these figures is a water purifier mounted a faucet directly, and the main housing 1 is attached to a faucet 2 with the adapter 3 and the fixed ring 4.

A water purification cartridge 6 is detachably mounted on the main housing 1, and the water purification cartridge cover 16 is fixed by screwing on or the like.

Switching mechanism 7 is provided in the main housing 1 and is operated by the switching lever 5. And it is possible to switch to outflow between unchanged tap water and purified water by the switching lever 5. That is, when the switching lever 5 is set to the tap water position, the tap water flows from the faucet 2 as it is through the tap water outlet 11, but when the switching lever 5 is set to the purified water position, tap water flows from the faucet 2, as shown by the arrows in the figure, and passes through the switching mechanism 7 and flows into the water purification cartridge 6, and is purified by passing through the activated carbon 8a and the porous hollow fiber membrane 8b therein, and purified water outflows downwards from the purified water outlet 9. The outflow of purified water from the water purification cartridge 6 reaches the purified water outlet 9 via the flow meter 42.

The water purifier 40 according to the present invention is provided with a flow meter 42 which measures the integrated outflow of the purified water. The flow meter 42 of this invention has a mechanical constitution, that is, it is provided with an impeller 23 which is rotated around the support axle 24 by the water flow and this rotation is sequentially transmitted through a plurality of gears 25 and its speed is reduced, and the final rotating gear is fixedly connected to the indicator portion 44. These rotating members are built into the housing 26, and at least the side where the indicator portion 44 is located in the housing 26 is formed of a transparent material, so that the indicator portion 44 is visible from the outside.

A detailed explanation will now be given about the flow meter. Various kinds of flow meters 42 can be used, provided that they do not deviate from the gist of the present invention, for example the flow meters disclosed in Japanese Unexamined Patent Application, First Publication No. Hei 8-285642, and Japanese Unexamined Patent Application, First Publication No. Hei 8-318113 can be applied to the water purifier of the present invention.

Figure 7:
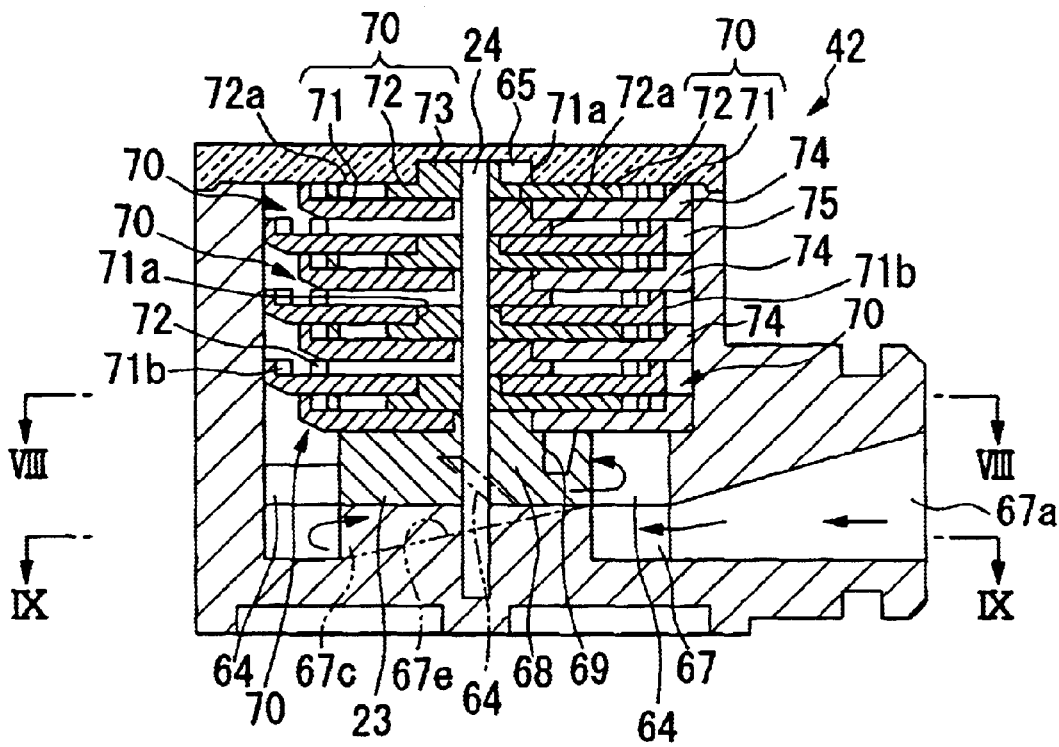
FIG. 7 is a cross sectional view of one example of a flow meter.

The present example of the flow meter 42 as shown in FIGS. 7–10 is mainly constituted of an impeller 23, and a speed reduction mechanism 65 which reduces the speed of the rotation by the impeller 23 and transmits the reduced speed, and a support axle 24 which supports them inside the housing 26. In FIG. 7, the indicator portion 44 is omitted.

Figure 8:
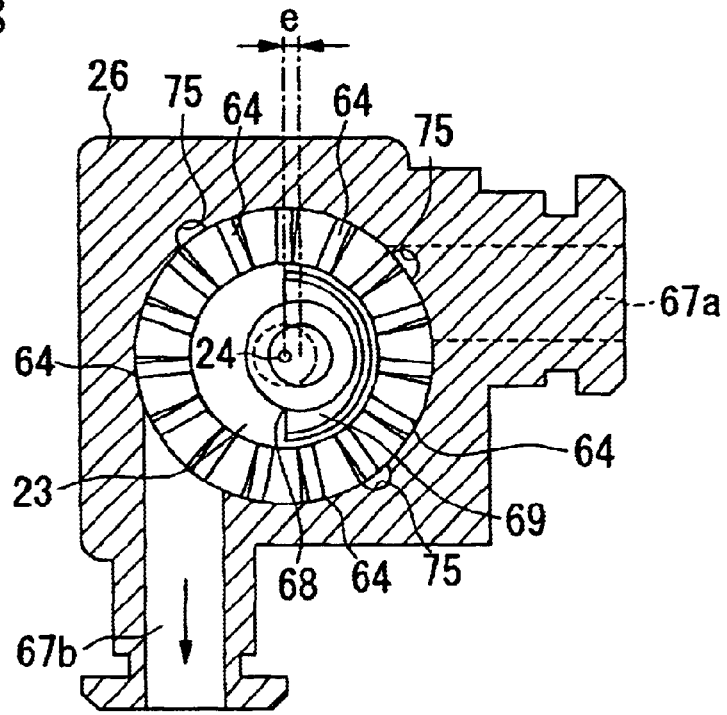
FIG. 8 is a sectional view along line VIII—VIII of FIG. 7.

On one face of the impeller 23 which is attached to the support axle 24 so as to rotate freely, that is, the face of the side at which the speed reduction mechanism 65 is disposed on the same axle, an eccentric boss 68 is integrally formed so as to protrude. The center of the eccentric boss 68 as shown in FIG. 8 is eccentric from the axis of the support axle 24, that is, the center of the impeller 23 by only the distance e. Further, in order to cancel the shift of the center of gravity caused by the provision of the eccentric boss 68, the cut out portion 69 is formed on the impeller 23. Further, the eccentric boss 68 is interfittedly connected so as to rotate freely to the hole 71a of the internal gear 71 of the internally toothed planetary gear train 70 of the first stage of the speed reduction mechanism 65, which is located on the same axis as the impeller 23 by the support axle 24.

Further, a purified water passage 67 is formed in the housing 26. This purified water passage is constituted of an inflow port 67a, an outflow port 67b, and the annular portion 67c. The cross-sectional area of the flow passage of the inflow port 67a gradually decreases along flow of the purified water, and the cross-sectional area of the flow passage of the outflow port 67b gradually increases. The inflow port 67a and the outflow port 67b are formed so as to offset each other.

Figure 9:
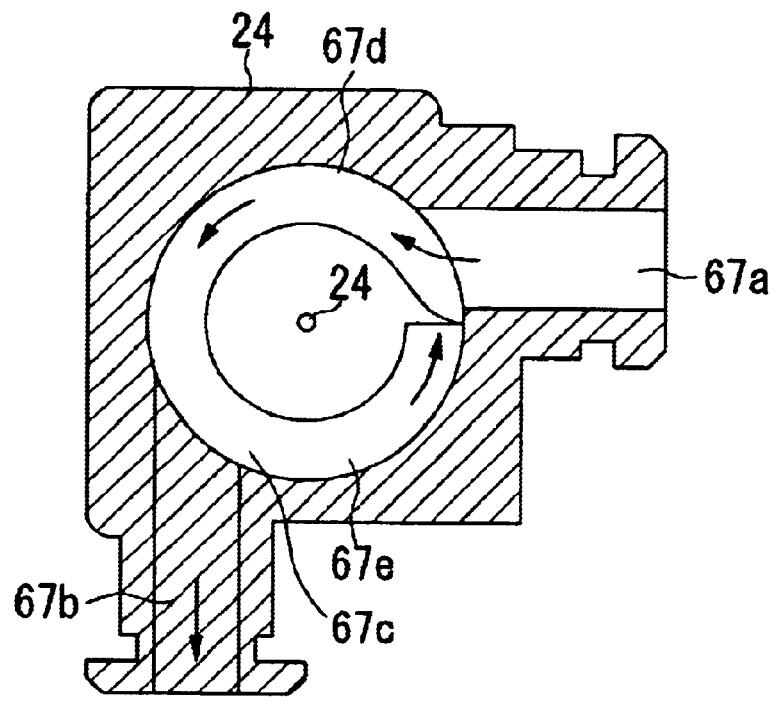
FIG. 9 is a sectional view along line IX—IX of FIG. 7.

The annular portion 67c of the purified water passage 67, as shown in FIG. 9, encloses the support axle 24. On the bottom of the annular portion 67c, the portion 67d which goes from the side of the inflow port 67a to the side of the outflow port 67b is formed perpendicular to the support axle 24, but the portion 67e which returns from the outflow port 67b to the inflow port 67a is formed slanted to the support axle 24. So the annular portion 67c, in the return portion 67e, becomes shallower in the direction of downstream. Consequently, the purified water which flows into the annular portion 67c from the inflow portion 67a is led into the annular portion 67c and flows around the support axle 24 in a spiral flow and rotates the impeller 23. The purified water rotates the impeller 23 by means of going though between the blades 64 of the impeller 23. After this, the purified water outflows from the outflow port 67b. Namely, the most of the purified water which flows into the annular portion 67c from the inflow port 67a outflows toward the outflow port 67b after making one turn in the spiral and making the impeller 23 turned.

The speed reduction mechanism 65 is constituted of multistep internally toothed planetary gear trains 70 which are sequentially stacked. In the case of the present example, seven stages of internally toothed planetary gear trains 70, 70, . . . are provided. Each internally toothed planetary gear train 70 is provided with an internal gear 71, a sun gear 72 and an eccentric boss 73, and they are sequentially coupled by fitting the eccentric boss 73 provided on the sun gear 72 with the hole 71a of the internal gear 71 on the downstream of the transmission of rotation.

Figure 10:
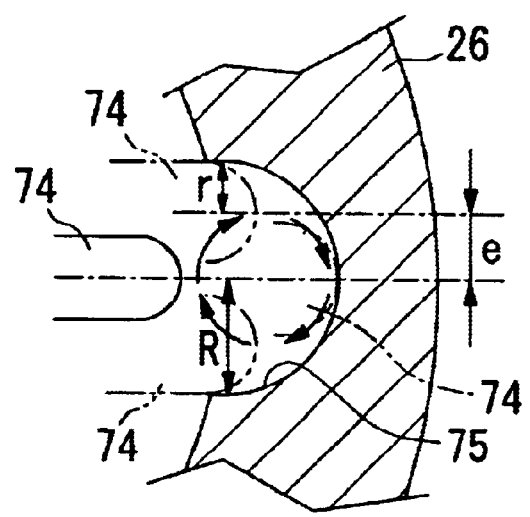
FIG. 10 is an enlarged view of the projection and indentation of the flow meter shown in FIG. 7

With respect to the housing 26, the internal gear 71 is capable of circular motion around the support axle 24, but not rotation. To explain this in detail, a plurality of protrusions which project in the radial are formed on the outside of peripheral face of the internal gear 71. In the case of the present example, protrusions 74 are provided at four positions with equal intervals along the circumference. On the other hand, on the internal face of the housing 26, a plurality of indented portions 75 are provided corresponding to the protrusions 74. Each indented portion 75 is a groove formed along the direction of the support axle 24. Each protrusion 74 is inserted into a respective indented portion 75. The tip of each protrusion 74, as shown in FIG. 10, is rounded with a hemispherical shape with a radius of r. Further, the cross sectional shape of each of the indented portions 75 is semicircular with a radius of R. These radii satisfy the relationship of the equation $$R=r+e.$$

Consequently the tips of each protrusion 74 is capable of circular movement along the internal face of each respective indented portion 75, and the internal gear 71 is capable of circular movement of which a radius is the amount of eccentricity e around the support axle 24. However, all protrusions 74 are not simultaneously released from the corresponding indented portions 75, and at least a part of the protrusions 74 will surely be engaged with the housing 26 and therefore the internal gear 71 is unable to rotation. The holes 71a are formed at the center of the internal gears 71.

Further, the sun gear 72 is located on the inside of the gear portion 71b of the internal gear 71 and is engaged with this gear portion 71b.

By setting the number of teeth of the gear portion 71b of the internal gear 71 and of the sun gear 72 to predetermined values, the speed reduction function is obtained.

Further, a hole 72a is formed in the vicinity of the eccentric boss 73 of the sun gear 72 to cancel a shift of the center of gravity caused by the provision of the eccentric boss 73.

The eccentric boss 73 of the sun gear 72 has a protrusion formed on the face of the side of the next lower stage of the internally toothed planetary gear train 70. The center of this eccentric boss 73, like an eccentric boss 68 formed on the impeller 23, is eccentric from the center of the sun gear 72, that is, of the support axle 24 by only the distance e. The eccentric boss 73 is engaged with the hole 71a in the center of the internal gear 71 which constitutes the next stage of the internally toothed planetary gear train 70, whereby these are coupled so as to rotate freely. So this eccentric boss 73 and the internal gear 71 of the next stage form one body and execute circular motion.

Further, the eccentric boss 68 of the impeller 23 is engaged and coupled to the inside of the hole 71a of the internal gear 71 which constitutes the first stage of the internally toothed planetary gear train 70. Therefore the internal gear of the first stage and the eccentric boss 68 of the impeller 23 form one body and execute circular motion.

When purified water is led to the inflow port 67a of a flow meter having this constitution, after the flow of the purified water is constricted and its speed is increased, it flows into the annular portion 67c and rotates the impeller 23. This purified water flows in a spiral inside the annular portion 67c, and takes an effect all around the impeller 23. Moreover, the purified water passes through between each of the wings 64 flowing in a spiral and takes an effect on the full face of each wing 64. Then the purified water flowed from the annular portion 67c to the outflow port 67b flows out from the purified water outlet 9 after its flow rate is reduced in the outflow port 67b.

On the other hand, the rotation of the impeller 23 is transmitted to the speed reduction mechanism 65. That is, the circular motion of the eccentric boss 68 is performed by the rotation of the impeller 23, and that of internal gear 71 of the first stage of internally toothed planetary gear train 70 of the speed reduction mechanism 65 is performed, the speed of circular motion is reduced, and the rotation is transmitted to the sum gear 72 of the final stage. Usually the sum gear of the final stage will rotate once per each 10000000 rotations of the impeller 23.

The rotation of the impeller 23 corresponds to the flow in the passage 67, and therefore, the amount of rotation of the sun gear 72 of the final stage is proportional to the integrated flow in the passage 67. Consequently, the rotation of the indicator portion 44, which is connected thereto, is also proportional to the integrated flow.

The flow display of the flow meter 42 is constituted, broadly speaking, by an indicator portion 44 which rotates with an increase of the flow, a graduated portion 46 which can rotate around the same axis as the indicator portion 44 rotates around and is located so that the transparent housing 26 could be sandwiched between two. The graduated portion 46 is held to the housing 26 by a screw 27 in its center, and can rotate for the housing 26. As a result, it is possible to perform a resetting operation by rotating the graduated portion 46 in the same direction as the indicator portion 44 rotates, by the same amount of rotation as the indicator portion 44 rotates, in order to return to the original point (reset to the point of origin).

Figure 3:
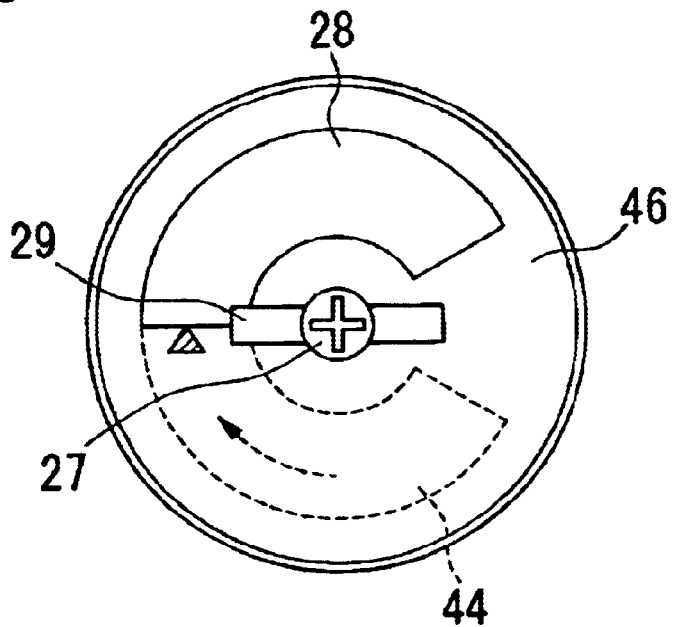
FIG. 3 shows one example of the flow display according to the first embodiment.

With respect to design, various different combinations can be used for the indicator portion 44 and the graduated portion 46. In the example shown in FIG. 3, the indicator portion 44 which interlocks with the gear, is formed in the shape of a sector, and a sector shaped window 28 corresponding to it is formed in the graduated portion 46. In this case, initially the indicator portion 44 is hidden by the graduated portion 46 and it is just not visible, and as the flow increases, the sector shaped indicator portion rotates in the clockwise direction, and it gradually becomes exposed from the sector shaped window 28 of the graduated portion 46. Consequently, when the amount of flow to replace the water purification cartridge 6 has flowed, by means of adjusting the gear ratio as the window 28 is completely filled by the indicator portion 44, a guide for replacing the water purification cartridge 6 can be provided.

The users, along with replacing the water purification cartridge 6, rotate the graduated portion 46 in the direction of rotation of the indicator portion 44, and reset by means of returning to the state before operation that the window 28 is completely empty, and start to use again. And so the amount of flow of a new water purification cartridge 6 is integrated, it is possible for them to know when to replace the water purification cartridge 6.

The flow display is not restricted to only this type of device. For example, it is also possible to use the indicator portion 44 as a guide. Further, it is also possible to form the graduated portion 46 with a transparent material and to provide letters or symbols indicating the starting time and the replacement time with a label or printing on the front or rear thereof. And on the rear of the graduated portion 46 a plate with a printed seal has been also applied to it.

In the case of printing as mentioned above, for example, the words "start of use" and "replace" are printed and when the indicator needle has rotated to the "replace", this indicates that the water purification cartridge 6 should be replaced. When this condition is reached, along with the replacement, the users not only replace but also rotate the graduated portion 46 in the direction of rotation of the indicator portion 44 to align the needle with the word "start of use", and when the water purifier is started to use again, the integrated flow of the new cartridge will be measured, and its replacement time will be known.

In this way, although its constitution is simple, it is capable of knowing when to replace the water purification cartridge 6, moreover, after replacing the water purification cartridge, because there is a reset function, it is possible to know the next replacement time.

Figure 11:
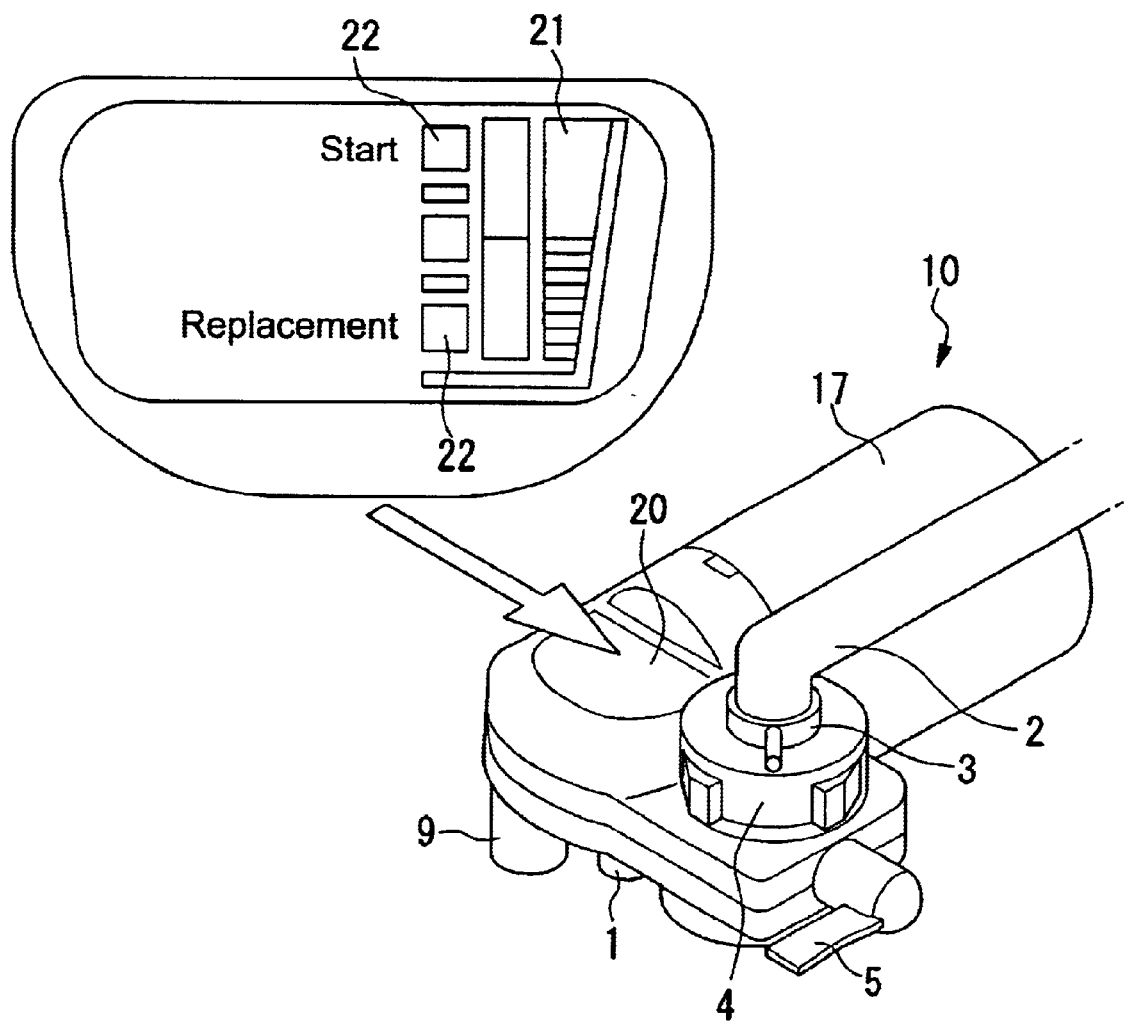
FIG. 11 is a perspective view of a prior art water purifier which is directly mounted a faucet.

According to the constitution of the present example, compared to the flow meters disclosed in Japanese Unexamined Patent Application, First Publication No. Hei 8-285642, and Japanese Unexamined Patent Application, First Publication No. Hei 8-318113, because it makes do with addition of the graduated portion 46 in the shape of disk which is slightly larger than the housing, and small screws, even though functions are added, increases in cost and size can be kept to a very small level. Further, compared to the water purifier 10 shown in FIG. 11, because there is no complex built-in resetting mechanism, it has advantages that the cost and size of it can be reduced. Especially to provide it adjacent to the switching mechanism 7 makes it to avoid largely increases in the size of the water purifier.

Further, because the flow meter is provided not on the water purification cartridge 6 but on the main housing 1, if the water purification cartridge 6 is replaced, the flow meter can continue to be used, and therefore the users can hold down the running costs, and this is also preferable from the environmental point of view.

If the screw 27 is removed, the graduated portion 46 can be detached from the flow meter 42 and the water purifier 40. As a result, if the graduated portion 46 is soiled with bacteria or mold, it can be soaked with detergent and washed, and its rear side can be even scrubbed, and it is easy to clean it thoroughly, and if it is very soiled, it can be replaced.

Further, in the present example, the graduated portion is held on the housing 26 by the screw 27, but it is not especially limited to this constitution. For example, bayonet-like constitution, a plurality of protrusions can provided on the outside of periphery of the graduated portion 46, and a plurality of gripping arms can be provided on the outside of periphery of the housing 26 to engage the two, can be applied. And sandwich constitution, that is, a plurality of arms can be provided on the outside of periphery of the graduated portion 46, and a plurality of indented grooves can be provided on the outside of periphery of the housing 26 into which the arms of the graduated portion 46 are press fit and held.

Further it is desirable that the graduated portion 46 be curved so that its surface protrudes outwards with a spherical shape and it is desirable to provide an insertion groove 29 approximately in its center, into which the edge of a coin or the like can be inserted so that the flow meter 42 can be reset by the operation of inserting a coin of 10 yen and the like and of rotating it. Besides an insertion groove for a coin, for example, a minus or cross-shaped insertion groove to permit the rotating operation by a screwdriver, or a hexagonal insertion groove or the like to permit the rotating operation by a hexagonal wrench can be provided, but among these, an insertion groove for a coin is preferable. If a groove is set so that tools a screwdriver or the like could be used, it is necessary to purchase and store expensive tools, and there is the concern that they may become lost, however, if it is set so that coins, which are always available, can be used, these drawbacks are overcome.

Further, easy and precise operation is possible by inserting and rotating a coin, but because it is difficult for small children to do this, changing the setting can be prevented from getting into mischief, and furthermore, there is the advantage that objects are less likely to be snagged, because a small groove is only provided. These advantages are especially effective for a water purifier mounted a faucet directly which is connected to a faucet directly in kitchen where several people frequently use water.

Furthermore, the effect of the spherically protruding curvature of the graduated portion 46 is that, at the same time as making it easier for users to insert a coin, it can provide extra thickness to the portion by cutting the edge of the insertion groove 29 which is used to be thin, and so it is possible to improve its strength. When the degree of curvature of the spherical portion is small, the above effects cannot be obtained, so it is preferable to set the radius of curvature to 50 mm or less. If the insertion groove 29 is shallow, slippage will occur, so it is preferable to make its depth 1 mm or more. If the width is too large, the fit will be loose, and if the width is too small, the fit will be too tight, and in order to be compatible with various types, it is preferable to set the width to 1.8 to 2.2 mm. In order to allow the graduated portion 46 to rotate, a round shape is preferable, but if its diameter is too large, the main housing 1 will also have to be large and cumbersome, and if it is too small, the indicator portion 44 will be small and it is difficult to read it and not possible to provide an adequate insertion groove 29, therefore, it is preferable to set the size to 20–30 mm.

In the graduated portion, it is possible to provide markings which serve as guides for the replacement time for several different types of water purification cartridge 6.

Figure 4:
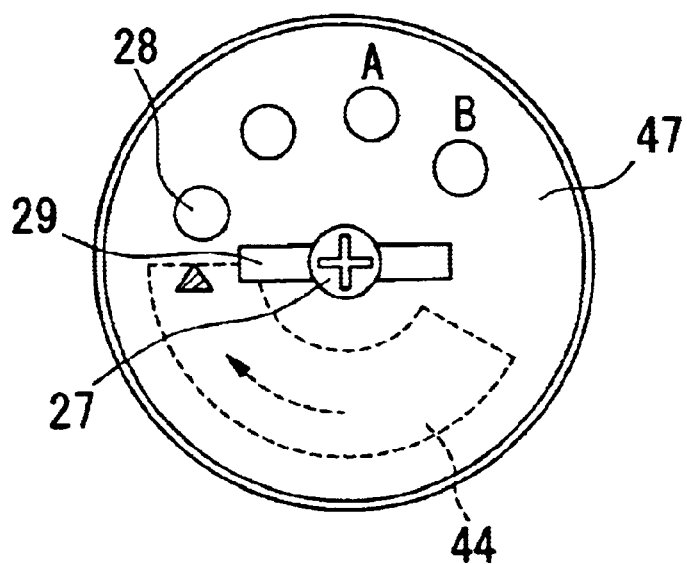
FIG. 4 shows another example of the same flow display.

For example, as shown in FIG. 4, as a means of knowing the replacement time of both of two different types A and B of water purification cartridge 6 having different lifetimes, markings comprising the symbols A and B are printed on the rear surface near the windows 28 of the graduated portion 47. In this case, as the flow increases, the sector shaped indicator portion 44 rotates in the clockwise direction and gradually fills the four round windows 28 of the graduated portion 47 by turns, and if the water purification cartridge A is used, when the third window is filled and the indicator portion 44 is reached to symbol A, this indicates that the water purification cartridge A should be replaced. On the other hand, in the case of using the water purification cartridge B which has a longer lifetime, when the fourth window B is filled and it is reached to symbol B, this indicates that the cartridge B should be replaced.

Consequently the time for replacement according to the installed type of water purification cartridge 6 can be known.

When the time for replacement is indicated, the user, along with replacing the water purification cartridge 6, performs the resetting by rotating the graduated portion 47 in the direction of rotation of the indicator portion 44 until the windows 28 of the graduated portion are completely empty. And the user returns to the condition before operation, and can again start to use the water purifier.

In the present example, markings consisting of symbols are used as the means of indicating the replacement time, but it is not limited to this, and letters, graduations, indicators, patterns or the like devised with printing or seals can be used.

As the principal material for the main housing of the water purifier of the present invention, in consideration of formability and strength, plastics such as ABS, AS, PP or the like are preferable.

In the flow meter 42 used in the water purifier of the present invention, the size, shape, and speed reduction rate of the rotating members such as the impeller 23 and the gears 25 are not particularly limited, and the design of them can appropriately be performed with the flow setting. For the material, in consideration of the abrasion, it is preferable to use an engineering plastic such as POM, PBT, or PC or the like. Among these, polyacetal resin is preferred in view of its excellent lubricity and its excellent resistance to abrasion and mechanical strength, and particularly a polyacetal resin containing carbon is desirable, because its resistance to abrasion significantly improves and its durability is excellent.

The interior of the water purification cartridge 6 is optimally filled with an absorbent such as granular activated carbon, calcium sulfite, activated carbon fibers and the like and a filtration membrane such as a porous hollow fiber membrane, porous flat membrane, ceramic filter and the like, in accordance with the specified performance and objectives to remove from water. In the present example, granular activated carbon 8a for the objective of removing residual chlorine, and a porous hollow fiber membrane 8b for the objective of removing impurities, are used in combination. For the removal of impurities, it is preferable to use a porous hollow fiber membrane, which has excellent filtration capability and can even remove bacteria.

In the present example, the flow meter is located on a stage subsequent to the water filtration cartridge 6. That is, the flow meter 42 is located downstream of the water purification cartridge 6 so that it could measures the flow of the purified water though the water purification cartridge. As a result, because the porous hollow fiber membrane 8b in the water purification cartridge 6 completely removes impurities, it is possible to prevent malfunctions of the flow meter 42, due to clogging of the rotating members by impurities and this location is ideal.

Furthermore, for the water purifier according the present first embodiment, in the same way as for the below-described second embodiment, it is possible to form a spot of the main housing 1 corresponding to the location of the impeller 23 of the flow meter 42 with a transparent material, so that the impeller 23 is visible from the outside. The visible impeller 23 from the outside makes it possible to find out malfunctions of the flow meter 42 at an early stage. Furthermore, if the impeller is set so as to start rotating at or above a predetermined value of the water flow, it is possible to perceive that it is time to replace the purification cartridge, due to a decrease of the instantaneous flow or the like. Further, because the entire flow meter 42 is detachable, it is possible to easily dean the flow meter 42.

Second Embodiment

Figure 5:
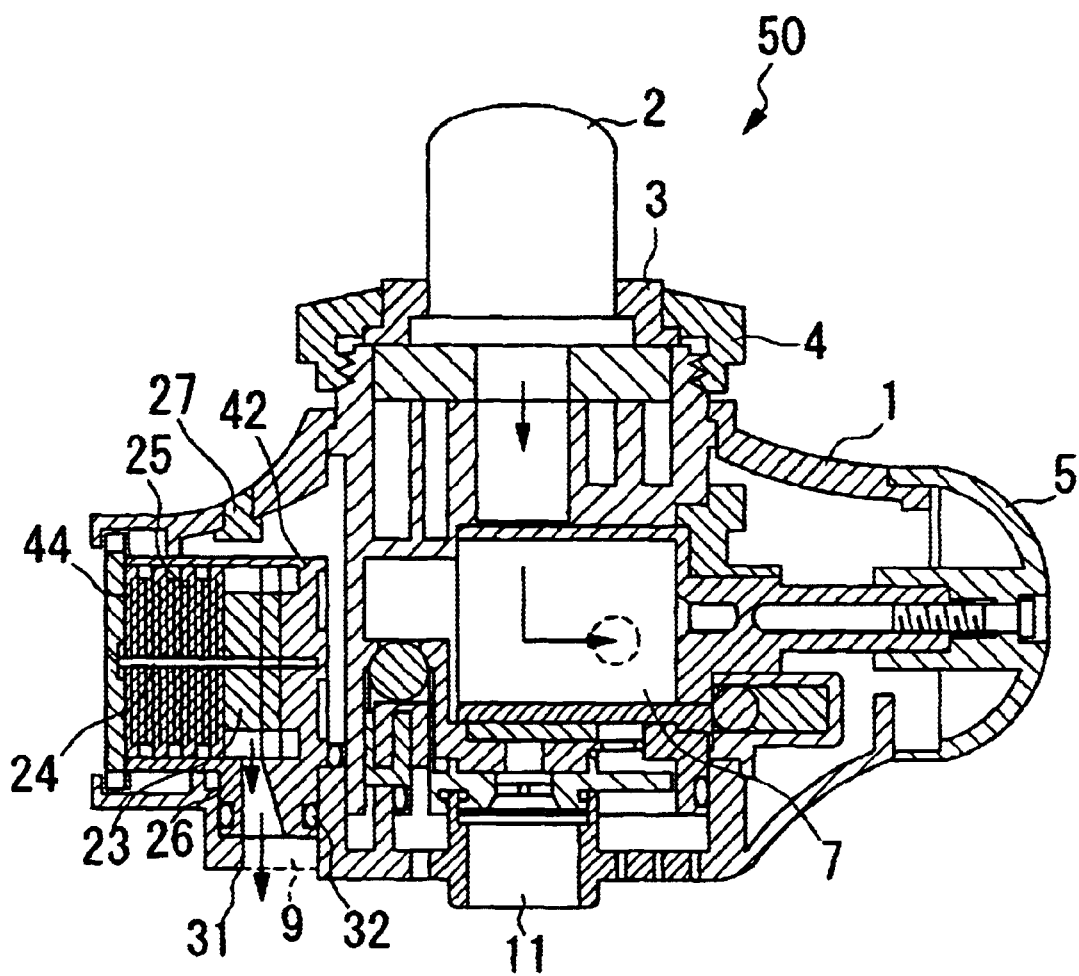
FIG. 5 is a longitudinal sectional view of the water purifier according to the second embodiment.
Figure 6:
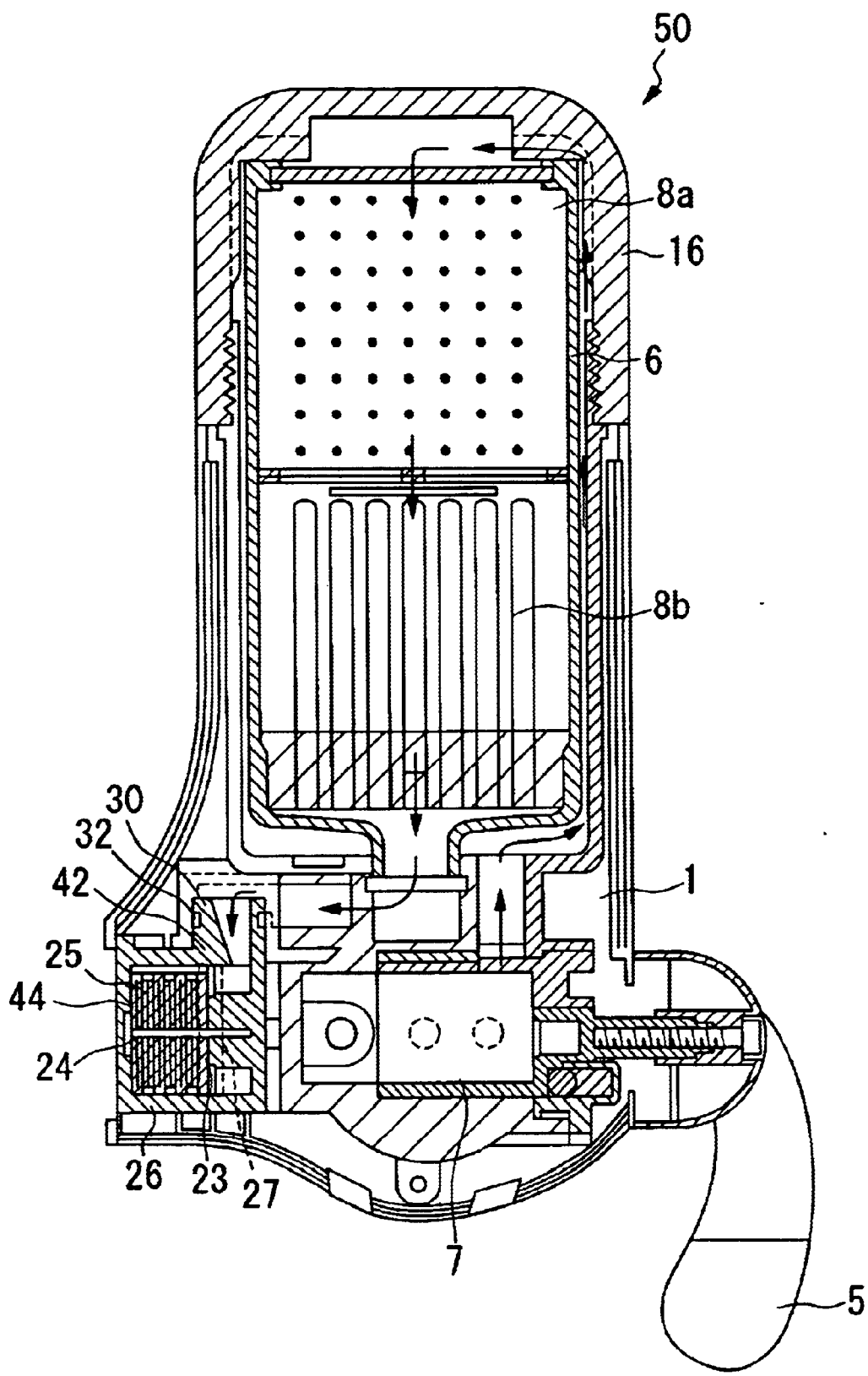
FIG. 6 is a cross sectional view of the water purifier according to the second embodiment.

The second embodiment will now be explained with reference to FIGS. 5 and 6.

The water purifier 50 shown in the figures is a water purifier mounted a faucet directly, and the main housing 1 is attached to a faucet 2 with an adapter 3 and a fixed ring 4.

The water purification cartridge 6 is detachably attached to the main housing 1, and the water purification cartridge cover 16 is fixed by screwing on or the like.

Switching mechanism 7 is provided in the main housing 1 and is operated by the switching lever 5, and it is possible to switch between unchanged tap water from the faucet 2 and purified water. That is, when the switching lever 5 is set to the tap water position, tap water flows unchanged from the faucet 2 through the tap water outlet 11, but when the switching lever 5 is set to the purified water position and tap water flows from the faucet 2, as shown by the arrows in the figures, tap water passes into the switching mechanism 7 and it flows into the water purification cartridge 6 and passes through the internal activated carbon 8a and the porous hollow fiber membrane 8b therein, and outflows purified water downwards from the purified water outlet 9. The purified water flowing out from the water purification cartridge 6 reaches the purified water outlet 9 via the flow meter 42.

The water purifier 50 according to the present invention is provided with a flow meter 42 which measures the integrated outflow of purified water. With respect to mechanical constitution, the example of the flow meter 42 shown in the figures is provided with an impeller 23 which is rotated around a support axle 24 by the water flow, and this rotation is sequentially transmitted through a plurality of planetary gears 25 and its speed is reduced, and the final rotating gear is fixedly connected to the indicator portion 44. These rotating members are contained in the housing 26, and at least the side where the indicator portion 44 in the housing 26 is located, is formed of a transparent material, so that the indicator portion 44 is visible from the outside (in FIG. 5, this is the surface to the left of the water purifier).

The integrated flow which has passed through the flow meter 42 can be known, because the indicator portion 44 will rotate by a predetermined amount corresponding to the flow, and in practice, when the movement of the indicator portion 44, which rotates inside a transparent housing 26 as the flow increases, is seen from the outside, the integrated flow can be recognized by ascertaining the amount of motion and the time to replace the water purification cartridge 6 can be known.

Like the first embodiment, any appropriate flow meter can be used, and the flow meter explained in the first embodiment can be applied.

In the flow meter 42, the water inlet 30 and the water outlet 31 of the housing 26 are fixed with a water tight seal to the water flow passage of the final stage of the water purification cartridge 6 in the main housing 1 of the water purifier by the packing 32. As a result, since the flow meter 42 is not built into the water purification cartridge 6, the cost of the flow meter 42 is not added onto the cost of the water purification cartridge 6, and the cost of the water purification cartridge 6 which is frequently replaced, is not increasing, which is economically favorable.

Furthermore, because the flow meter 42 itself is not discarded after finish of use like the water purification cartridge 6, the flow meter 42 is not disposed as waste at any time when the water purification cartridge 6 is replaced, which is excellent from the environmental point of view, and especially effective for a water purifier mounted a faucet directly of which the water purification cartridge 6 is frequently replaced.

The flow meter 42 can be separated from the main housing 1 using ordinary tools such as a screwdriver, and by merely pulling the inflow port 30 and the outflow port 31, where the packing 32 of the housing 26 is embedded, out from the water flow passage, it can be easily detached from the main housing 1, and is detachably attached. As a result, if the flow meter 42 is soiled, it can be detached, soaked with detergent and washed and scrubbed, and if it is heavily soiled, it can be replaced, and furthermore, if it breaks down, it can be detached and repaired or replaced, and which is excellent with respect to maintenance.

In the main housing 1, a transparent window 27 is provided above the impeller 23 which is sandwiched by the transparent housing 26, and when it is viewed from above this window 27 (from the upper surface of the water purifier), it is possible to observe the impeller 23. Accordingly, in case the rotating members of the flow meter 42 become abraded or rupture, due to an increase of water flow over a long time, or foreign matter flows in and becomes temporarily stuck at the time of replacement of the water purification cartridge 6, it is possible for the user to ascertain visually situations that the impeller 23 will not rotate smoothly, or will stop rotating altogether, and the user can easily and unmistakably recognize malfunctions.

With respect to shape of the window 27, many different designs can be used, but it is preferable to match it as the shape of the impeller 23 as possible. If its area is too large, the material costs will increase, and if it is too small, it is difficult to look inside, and in practice, it is preferable to set it to about 0.5 $cm^2$ to 2 $cm^2$. If it is too thick, the material costs will increase and it will be difficult to look inside, so it is preferable to set the thickness to 3 mm or less.

For the material of the window 27, in consideration of formability and cost, a plastic such as a transparent ABS resin, acrylic resin, polypropylene resin or the like is preferable.

In the present example, the window 27 is formed of a transparent acrylic resin plate of approximately 2 mm thickness fixed with an adhesive to the rear of the main housing 1 made of an ABS resin, but in case the window 27 and the main housing 1 are made of the same type of plastic, they can be attached by ultrasonic welding or using the two color formation method, a transparent material which will be the window can be formed at the same time as the main housing 1 is formed and it can be embedded in the main housing 1. Further, if controlling material costs is of prime importance, a part of the main housing 1 corresponding to the location of the window 28 can be cut out without using a transparent material.

In the flow meter 42, the impeller 23 is rotated around the supporting axle 24 by the water flow, but in the present example, the impeller 23 is set so that it could begin to rotate when the water flow is 1 L per minute or more. This can be done, for example, by adjusting the shape and area of the blades of the impeller or the size of the inflow port 30 which determines the amount of water flow there.

In this way, if the flow of purified water is below a predetermined value (in this case, 1 L/min), rotation can not occur, and if the porous hollow fiber membrane 8b which is the filtering material in the water purification cartridge 6, becomes clogged, due to a long time use and the instantaneous flow is reduced, the flow rate is reduced (in this case, 1 L/min or less) and the time required to draw water is increasing, and the convenience of use is lost, by looking into the window 27, the user can visually ascertain by observing that the impeller 23 is not rotating and the user can recognize that it is time to replace the cartridge 6.

If the predetermined value of the water flow at which the impeller stops rotating is too high, then the time to replace a water purification cartridge 6 will come too soon and the filtering material will be wasted, while if it is too low, the time required to draw water will be too long and the convenience of use will be lost, so in practice, setting a value of from 0.5 L to 1 L per minute is preferable.

The impeller 23 is contained in the main housing 1, and so it will inevitably be dark when it is viewed from the outside. In order to make it easy to recognize visually, it is preferable that the entire body of the impeller consists of vivid and noticeable colors such as red or yellow.

In order to facilitate more to recognize whether the impeller 23 is rotating or stopped, the tips of the impeller blades can be colored differently from the main body color of the impeller, or it is preferable to arrange colors of the impeller so that the colors could change in appearance when the blades rotate.

In the invention as described above, the flow meter 42 which displays the integrated flow can show the time to replace the water purification cartridge 6 with a reduction of the instantaneous flow. If these two functions are built into the main housing 1, the main housing contains separate mechanisms having each of these functions, so the housing would have to be increased in size and cost, but this problem has been completely overcome and particularly a water purifier mounted a faucet directly, required to be low cost and compact, exhibits remarkable effects.

For the principal material of the main housing of the water purifier in the present invention, in consideration of formability and strength, it is preferable to use a plastic such as ABS resin, AS resin or the like.

In the flow meter 42 used in the water purifier of the present invention, the shape and speed reduction ratio of the rotating members such as the impeller 23 or the gears 25 and the like are not particularly limited, but it is preferable to appropriately set them to be compatible with the settings such as the flow rate and the like. For the material of them, in consideration of abrasion, it is preferable to use an engineering plastic such as a polyacetal resin, polycarbonate resin, polypropylene resin, PBT or the like, and among them a polyacetal resin is preferable for its excellent lubricity and its excellent resistance to abrasion and mechanical strength.

In the present example, for the impeller 23 and the gears 25, a polyacetal resin containing about 10 wt % carbon was used. When it is compared to flow meters of prior art making of polyacetal resin only, the abrasion resistance is significantly improved, and compared to the amount of water flow until the rotating members can not rotate normally, the durability was improved more than second fold.

If the amount of added carbon is too low, the above effects are not obtained, and if the amount is too high, the formability becomes poor and the dimensional accuracy deteriorates, and the lubricity deteriorates, and noise is emitted, and so an amount of 5–20 wt % is preferable.

The inside of the water purification cartridge 6 is optimally filled with an absorbent such as granular activated carbon, calcium sulfite, an activated carbon fiber or the like, and a filtration membrane such as a porous hollow fiber, a porous membrane, a ceramic filter or the like in accordance with the specified performance and the objectives to remove. In the present example, granular carbon 8a for the objective of eliminating residual chlorine, and a porous hollow fiber membrane 8b for the objective of removing impurities were used in combination. For the removal of impurities, it is preferable to use a porous hollow fiber membrane which has excellent filtration performance and can even remove bacteria.

In the present example, the flow meter 42 is located on a stage after the water purification cartridge 6. As a result, because the porous hollow fiber membrane 8b in the water purification cartridge 6 completely removes impurities, it is possible to prevent malfunctions of the flow meter 42, due to clogging of the rotating members by impurities, and so this location is ideal.

Further, for the water purifier of this second embodiment, it is also possible to add a resetting function to the flow display of the indicator portion 42 like first embodiment described above. If this is done, it is possible to know the renewed integrated flow without an increase in size or complexity. And the replacement time for the water purification cartridge 6 can be easily ascertained, even if the water purification cartridge 6 is replaced. Furthermore, at this time, by providing markings which serve as guides for the replacement time for several different types of water purification cartridge having different lifetimes, even if the type of water purification cartridge 6 is changed, the replacement time can be known.

The present invention can be embodied in various forms which do not deviate from the spirit or main characteristics thereof. So the preceding embodiments are in all respects merely illustrations of the invention, and should not be interpreted as limiting the invention. The scope of the invention is shown by the claims, and the body of the specification is in no way restricting. Furthermore, all changes or modifications which fall within the scope of claims are included within the scope of the present invention.

What is claimed is:

1. A water purifier provided with a flow meter which measures an integrated flow of purified water passing through a water purification cartridge, wherein a flow display of said flow meter comprises an indicator portion which rotates in response to increasing cumulative flow; and a graduated portion in the shape of a disk having graduations on an outer surface thereof and which can rotate around a rotation axis which is the same as that of the indicator portion, wherein an insertion groove is formed at the outer surface of the graduated portion so that an operation to rotate said graduated portion can be carried out with a coin resulting in resetting of the flow meter.

2. A water purifier according to claim 1, wherein said graduated portion has a curvature so as to protrude outwards with a spherical shape, and said insertion groove is formed near the center of the top of the curvature.

3. A water purifier according to claim 1, wherein said graduated portion is detachable from said flow meter.

4. A water purifier according to claim 1, wherein markings which serve as guides for replacement times for srveral different types of water purification cartridges having different lifetimes are provided on said graduated protion.

5. A water purifier according to claim 1, wherein rotating members used in said flow meter are made of a polyacetal resin containing carbon as an additive.

6. A water purifier according to claim 1, wherein said water purification cartridge contains, as a filtering material, a porous hollow fiber membrane.

7. A water purifier according to claim 1, wherein said flow meter is located at a stage after said water purification cartridge.

8. A water purifier according to claim 1, wherein said water purifier is mounted to a faucet directly.

9. A water purifier according to claim 1, wherein a window is formed in said graduated portion, and said indicator portion is visible though the window.

10. A water purifier according to claim 1, wherein the width of the insertion groove is 1.8 to 2.2 mm.

11. A water purifier according to claim 1, wherein the diameter of the graduated portion is 20 to 30 mm.

* * * * *